United States Patent
Oh et al.

(10) Patent No.: US 11,027,525 B2
(45) Date of Patent: *Jun. 8, 2021

(54) CURVED LAMINATED GLASS AND MANUFACTURING METHOD FOR CURVED LAMINATED GLASS

(71) Applicant: LG CHEM, LTD., Seoul (KR)

(72) Inventors: Jun Hak Oh, Daejeon (KR); Chang Hee Lee, Daejeon (KR); Jae Hyuk Yoon, Daejeon (KR); Ho Seong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/340,057

(22) PCT Filed: Sep. 28, 2017

(86) PCT No.: PCT/KR2017/010872
§ 371 (c)(1),
(2) Date: Apr. 5, 2019

(87) PCT Pub. No.: WO2018/066903
PCT Pub. Date: Apr. 12, 2018

(65) Prior Publication Data
US 2020/0055282 A1    Feb. 20, 2020

(30) Foreign Application Priority Data

Oct. 7, 2016 (KR) .......................... 10-2016-0130076

(51) Int. Cl.
*B32B 17/10* (2006.01)
*C03C 3/085* (2006.01)

(52) U.S. Cl.
CPC .. *B32B 17/10119* (2013.01); *B32B 17/10036* (2013.01); *C03C 3/085* (2013.01);
(Continued)

(58) Field of Classification Search
CPC .................... B60J 1/00; B60J 1/001; B32B 17/10036–10128; B32B 17/10807–1099; C03C 21/00–002; Y10T 428/315
See application file for complete search history.

(56) References Cited

U.S. PATENT DOCUMENTS 3,801,423 A    4/1974    Van Laethem et al.
3,822,122 A    7/1974    Plumat et al.
(Continued)

FOREIGN PATENT DOCUMENTS

CN    105451987 A    3/2016
CN    105980148 A    9/2016
(Continued)

OTHER PUBLICATIONS

Yoshida, Satoshi, "Indentation and Indentation-Induced Densification of Glass" (Year: 2011).*
(Continued)

*Primary Examiner* — Z. Jim Yang
(74) *Attorney, Agent, or Firm* — Dentons US LLP (57) ABSTRACT

The present disclosure provides a curved laminated glass including a curved soda lime glass and a curved thin plate glass provided on a concave surface of the curved soda lime glass, in which a thickness of the curved soda lime glass is larger than a thickness of the curved thin plate glass, and compressive stress is formed on a surface opposite to a surface of the curved thin plate glass adjacent to the curved soda lime glass.

11 Claims, 3 Drawing Sheets

(52) U.S. Cl.
CPC ... *B32B 17/10761* (2013.01); *B32B 17/10871* (2013.01); *B32B 2307/536* (2013.01); *B32B 2315/08* (2013.01)

(56) References Cited

U.S. PATENT DOCUMENTS

| | | | |
|---|---|---|---|
| 4,429,953 A | 2/1984 | Zehnpfennig et al. | |
| 5,928,793 A * | 7/1999 | Kimura | C03C 21/002 |
| | | | 428/428 |
| 2008/0110208 A1* | 5/2008 | Ellison | C03C 3/091 |
| | | | 65/90 |
| 2008/0292856 A1* | 11/2008 | Garner | H01L 51/0097 |
| | | | 428/220 |
| 2009/0226671 A1* | 9/2009 | Yanase | C03C 3/095 |
| | | | 428/156 |
| 2012/0025559 A1 | 2/2012 | Offermann et al. | |
| 2014/0014260 A1* | 1/2014 | Chowdhury | B32B 17/061 |
| | | | 156/222 |
| 2014/0093702 A1 | 4/2014 | Kitajima | |
| 2014/0141206 A1* | 5/2014 | Gillard | B32B 17/10036 |
| | | | 428/174 |
| 2014/0171286 A1* | 6/2014 | Lee | C03C 3/091 |
| | | | 501/66 |
| 2014/0235425 A1* | 8/2014 | Nishizawa | C03C 3/087 |
| | | | 501/67 |
| 2015/0064411 A1* | 3/2015 | Sasai | B32B 3/28 |
| | | | 428/174 |
| 2015/0122406 A1 | 5/2015 | Fisher et al. | |
| 2015/0158275 A1* | 6/2015 | D'Errico | C08K 5/3477 |
| | | | 428/215 |
| 2015/0210588 A1* | 7/2015 | Chang | B32B 17/064 |
| | | | 361/750 |
| 2015/0329408 A1* | 11/2015 | Bookbinder | C03C 3/045 |
| | | | 428/410 |
| 2015/0358021 A1 | 12/2015 | Limb et al. | |
| 2016/0083282 A1* | 3/2016 | Jouanno | B32B 17/10 |
| | | | 156/102 |
| 2016/0136929 A1* | 5/2016 | Meiss | B32B 3/28 |
| | | | 428/174 |
| 2016/0354996 A1* | 12/2016 | Alder | B32B 17/10889 |
| 2017/0008377 A1* | 1/2017 | Fisher | B32B 17/10036 |
| 2017/0057205 A1* | 3/2017 | Notsu | B32B 17/10036 |
| 2018/0122838 A1* | 5/2018 | Ono | B32B 7/06 |
| 2018/0141850 A1* | 5/2018 | Dejneka | B32B 17/064 |
| | | | 361/750 |
| 2018/0215125 A1* | 8/2018 | Gahagan | C03C 3/095 |
| | | | 428/156 |
| 2019/0134953 A1 | 5/2019 | Oh et al. | |

FOREIGN PATENT DOCUMENTS

| | | | | |
|---|---|---|---|---|
| EP | 3450161 A1 | 3/2019 | | |
| JP | 11-11988 A | 1/1999 | | |
| JP | 2003-231209 A | 8/2003 | | |
| JP | 2014-129189 A | 7/2014 | | |
| JP | 2014-527011 A | 10/2014 | | |
| JP | 2015-521575 A | 7/2015 | | |
| JP | 2015205784 A | * 11/2015 | ....... B32B 17/10036 | |
| JP | 2018-527216 A | 9/2018 | | |
| KR | 10-2012-0004415 A | 1/2012 | | |
| KR | 10-2014-0008848 A | 1/2014 | | |
| KR | 10-2014-0026553 A | 3/2014 | | |
| KR | 10-2014-0088704 A | 7/2014 | | |
| KR | 10-2015-0036499 A | 4/2015 | | |
| KR | 10-2016-0003706 A | 1/2016 | | |
| KR | 10-2016-0095143 A | 8/2016 | | |
| WO | 98/01649 A1 | 1/1998 | | |
| WO | 2013/168592 A1 | 11/2013 | | |
| WO | WO-2016196531 A1 | * 12/2016 | ....... B32B 17/10761 | |
| WO | 2017/011270 A1 | 1/2017 | | |

OTHER PUBLICATIONS

Machine translation of JP 2015/205784 A, obtained from J-Platpat service of the JPO (Year: 2020).*
International Search Report PCT/KR2017/010872, dated Jan. 16, 2018.
Office Action of Chinese Patent Office in Appl'n No. 2017800622726, dated Jan. 27, 2021.

* cited by examiner

CURVED LAMINATED GLASS AND MANUFACTURING METHOD FOR CURVED LAMINATED GLASS

TECHNICAL FIELD

This application is a National Stage Entry of International Application No. PCT/KR2017/010872 filed on Sep. 28, 2017, and claims the benefit of and priority to Korean Application No. 10-2016-0130076, filed on Oct. 7, 2016, all of which are hereby incorporated by reference in their entirety for all purposes as if fully set forth herein.

The present disclosure relates to a curved laminated glass and a manufacturing method for curved laminated glass.

BACKGROUND ART

As a use such as an automobile windshield, laminated glass in which two sheets of curved molded glass and a lamination film between the two sheets are formed has been widely distributed. The two sheets of curved molded glass are manufactured in many cases so as to have the same glass composition and the same plate thickness for the purpose of reducing manufacturing process costs. The lamination film is composed of a resin such as polyvinyl butyral (PVB), and prevents broken glass from shattering.

Recently, thinning of laminated glass has been studied for the purpose of reducing the weight of an automobile, and it has been proposed that the glass at the outer side of the automobile is thicker than the glass at the inner side of the automobile by considering that an external object collides with the automobile, and the like. The laminated glass of the automobile has been generally manufactured by molding two sheets of glass used for lamination so as to have a curved surface of a target shape, and then subjecting the two sheets of molded glass to a lamination process.

Figure 1:
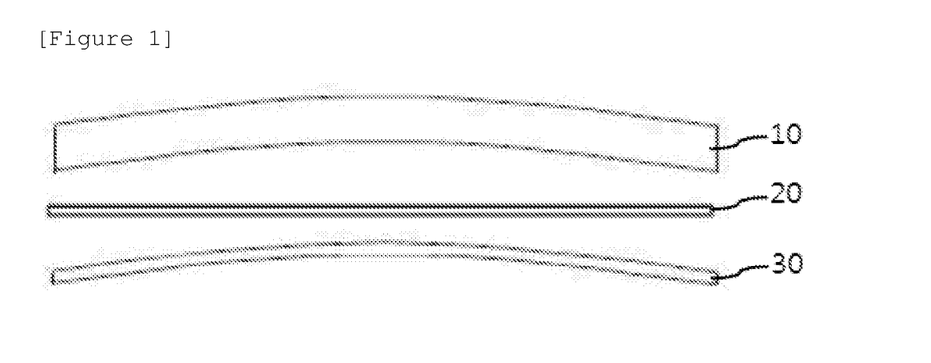
FIG. 1 schematically illustrates a thick plate glass, a lamination film, and a thin plate glass before curved laminated glass is laminated by a method in the related art.

FIG. 1 schematically illustrates a thick plate glass, a lamination film, and a thin plate glass before a curved laminated glass is laminated by a method in the related art. Referring to FIG. 1, a thick curved molded glass 10 and a thin curved molded glass 30 are prepared, and a lamination film 20 is interposed therebetween, thereby achieving lamination. At this time, glass 10 and glass 30 are prepared while being molded by means of a self-weight method by inserting a release agent between the two sheets of glass, and then exposing the two sheets of glass to a high temperature in a state where the two sheets of glass are placed onto a molding frame, or while being molded by means of a press method of inserting glass between upper/lower molds, and then applying pressure thereon at high temperature.

However, when laminated glass is manufactured by molding two sheets of glass, which have different thicknesses as described above, the two sheets of glass may not be molded into a desired shape due to the different bendabilities of the two sheets of glass, and further, even when the molding temperatures of the two sheets of glass are different from each other, the two sheets of glass are not molded into a desired shape. Furthermore, when a release agent is inserted between the two sheets of glass, and then the two sheets of glass are molded, there is a risk that scratches may occur on the surface of the glass due to the release agent interposed between the two sheets of glass, and during a molding process using a mold, molding work needs to be performed two times in order to produce one sheet of laminated glass, which acts as a factor which increases production costs.

Therefore, there is a need for a technology capable of achieving a reduction in weight of laminated glass and improving impact durability of the laminated glass.

DETAILED DESCRIPTION OF THE INVENTION

Technical Problem

The present disclosure has been made in an effort to provide a curved laminated glass and a method for manufacturing curved laminated glass.

However, a technical problem to be solved by the present disclosure is not limited to the aforementioned problem, and the other problems that are not mentioned may be clearly understood by the person skilled in the art from the following description.

Technical Solution

An exemplary embodiment of the present invention provides a curved laminated glass including: a curved soda lime glass; and a curved thin plate glass provided on a concave surface of the curved soda lime glass, in which a thickness of the curved soda lime glass is larger than a thickness of the curved thin plate glass, and compressive stress is formed on a surface opposite to a surface of the curved thin plate glass adjacent to the curved soda lime glass.

Another exemplary embodiment of the present invention provides a method for manufacturing a curved laminated glass, the method including: preparing a curved soda lime glass; providing a thin plate glass which is plate-like on a concave surface of the curved soda lime glass; and laminating the thin plate glass onto the concave surface of the soda lime glass by elastically deforming the thin plate glass to form a curved thin plate glass, in which a thickness of the curved soda lime glass is larger than a thickness of the curved thin plate glass, and compressive stress is formed on a surface opposite to a surface of the curved thin plate glass adjacent to the curved soda lime glass.

Advantageous Effects

According to an exemplary embodiment of the present invention, as compressive stress is formed on a surface opposite to one surface of a curved thin plate glass adjacent to a curved soda lime glass, it is possible to provide curved laminated glass in which impact resistance and fracture strength are improved.

According to an exemplary embodiment of the present invention, it is possible to effectively reduce a weight of curved laminated glass due to high mechanical properties of the curved thin plate glass.

According to another exemplary embodiment of the present invention, curved laminated glass may be economically manufactured through a simple process.

MODE FOR INVENTION

When one part "includes" one constituent element throughout the present specification, unless otherwise specifically described, this does not mean that another constituent element is excluded, but means that another constituent element may be further included.

Further, when one member is disposed "on" another member in the present specification, this includes not only a case where the one member is brought into contact with another member, but also a case where still another member is present between the two members.

The present inventors found that when thin plate glass is laminated onto one surface of curved molded soda lime glass by elastically deforming the thin plate glass, as compressive stress is formed on the other surface of an alkali-free glass, onto which the soda lime glass is not laminated, between one surface and the other surface of the alkali-free glass which is elastically deformed, it is possible to implement curved laminated glass in which impact resistance and fracture strength are improved, thereby developing curved laminated glass as described below and a manufacturing method thereof.

Hereinafter, the present disclosure is described in detail.

An exemplary embodiment of the present invention provides a curved laminated glass including: a curved soda lime glass; and a curved thin plate glass provided on a concave surface of the curved soda lime glass, in which a thickness of the curved soda lime glass is larger than a thickness of the curved thin plate glass, and compressive stress is formed on a surface opposite to a surface of the curved thin plate glass adjacent to the curved soda lime glass.

According to an exemplary embodiment of the present invention, as compressive stress is formed on a surface opposite to one surface of curved thin plate glass adjacent to curved soda lime glass, it is possible to provide curved laminated glass in which impact resistance and fracture strength are improved.

Figure 2:
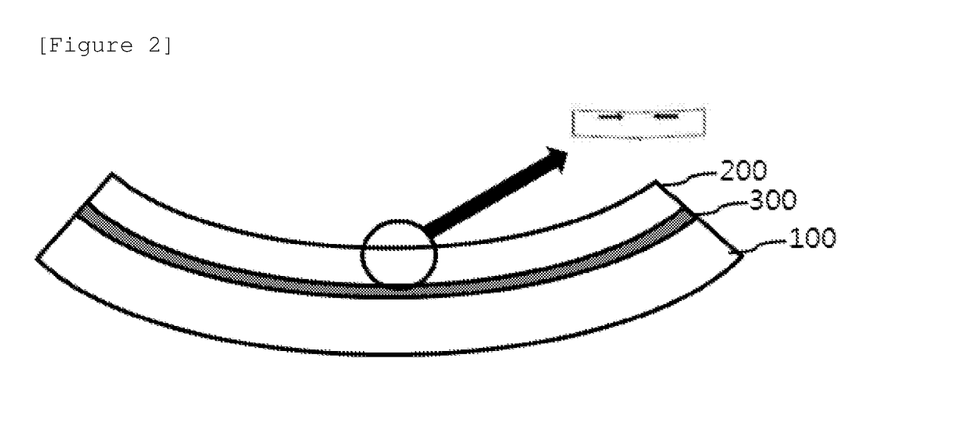
FIG. 2 is a view illustrating curved laminated glass according to an exemplary embodiment of the present invention.

FIG. 2 is a view illustrating the curved laminated glass according to an exemplary embodiment of the present invention. Specifically, FIG. 2 is a view illustrating a curved laminated glass in which a convex surface of a curved thin plate glass 200 is laminated onto a concave surface of curved soda lime glass 100 by a lamination film 300. Referring to FIG. 2, the curved soda lime glass 100 includes one concave surface and the other convex surface, the curved thin plate glass 200 includes one convex surface and the other concave surface, and compressive stress may be formed on the other concave surface of the curved thin plate glass.

According to an exemplary embodiment of the present invention, in a process in which a plate-like thin plate glass is elastically deformed and thus formed into a curved thin plate glass, compressive stress may be formed on a surface opposite to a surface of the curved thin plate glass adjacent to the curved soda lime glass. That is, curved laminated glass including curved thin plate glass in which compressive stress is formed on the other concave surface thereof may have excellent impact resistance and fracture strength.

According to an exemplary embodiment of the present invention, it is possible to effectively reduce a weight of curved laminated glass due to high mechanical properties of the curved thin plate glass.

According to an exemplary embodiment of the present invention, the curved thin plate glass may have better mechanical properties than those of the curved soda lime glass. Since the curved thin plate glass has better mechanical properties than those of the curved soda lime glass, mechanical properties such as impact resistance and durability of the curved laminated glass may be excellent, even when the curved laminated glass includes curved thin plate glass having a thickness smaller than the thickness of the curved soda lime glass.

According to an exemplary embodiment of the present invention, a Vickers hardness ratio of the curved soda lime glass to the curved thin plate glass may be 1:1.1 to 1:1.3. Specifically, a Vickers hardness ratio of the curved soda lime glass to the curved thin plate glass may be 1:1.12 to 1:1.27, 1:1.15 to 1:1.25, or 1:1.2 to 1:1.23. Curved laminated glass including the curved thin plate glass having a higher hardness than that of the curved soda lime glass may have excellent wear resistance, scratch resistance, and durability.

According to an exemplary embodiment of the present invention, the curved thin plate glass may have a Vickers hardness of 5.5 GPa to 7 GPa. Specifically, the curved thin plate glass may have a Vickers hardness of 5.8 GPa to 6.9 GPa, 6.0 GPa to 6.7 GPa, or 6.2 GPa to 6.5 GPa. Curved laminated glass including curved thin plate glass having a Vickers hardness value within the above-described range may have excellent impact resistance, wear resistance, durability, and the like. When the curved thin plate glass has a Vickers hardness of less than 5.5 GPa, there may occur a problem in that impact resistance of the curved laminated glass deteriorates, and when the curved thin plate glass has a Vickers hardness of more than 7 GPa, there may occur a problem in that manufacturing costs of the curved laminated glass are increased due to an increase in manufacturing costs of the thin plate glass. Further, the soda lime glass may have a Vickers hardness of 5.2 GPa to 5.8 GPa.

The Vickers hardnesses of the curved thin plate glass and the curved soda lime glass may be calculated by pressing down glass using a Vickers indenter, and then measuring a size of a mark. Specifically, the Vickers hardnesses of the curved thin plate glass and the curved soda lime glass may be measured by setting an indentation load and an indentation maintaining time to 200 gf and 20 seconds, respectively, in accordance with the ASTM C1327-08 standard under the conditions of a temperature at 24° C. and a humidity at 35 RH %.

According to an exemplary embodiment of the present invention, a fracture toughness ratio of the curved soda lime glass to the curved thin plate glass may be 1:1.3 to 1:1.5. Specifically, a fracture toughness ratio of the curved soda lime glass to the curved thin plate glass may be 1:1.35 to 1:1.49, 1:1.37 to 1:1.45, or 1:1.39 to 1:1.45. The curved thin plate glass has a fracture toughness within the above-described range as compared to that of the curved soda lime glass and thus may improve fracture resistance of curved laminated glass against external impact and may effectively prevent fracture strength of the curved laminated glass from being reduced.

According to an exemplary embodiment of the present invention, the curved thin plate glass may have a fracture toughness value of 1.0 MPa·m$^{1/2}$ to 1.3 MPa·m$^{1/2}$.

Specifically, the curved thin plate glass may have a fracture toughness value of 1.1 MPa·m$^{1/2}$ to 1.25 MPa·m$^{1/2}$, 1.15 MPa·m$^{1/2}$ to 1.25 MPa·m$^{1/2}$, or 1.18 MPa·m$^{1/2}$ to 1.21 MPa·m$^{1/2}$. Curved laminated glass including curved thin plate glass having a fracture toughness value within the above-described range may have excellent impact resistance.

When the curved thin plate glass has a fracture toughness of less than 1.0 MPa·m$^{1/2}$, in a process of laminating plate-like thin plate glass onto a concave surface of the curved soda lime glass, there may occur a problem in that the thin plate glass is broken, and there may occur a problem in that the impact resistance of curved laminated glass to be manufactured deteriorates. Further, when the curved thin plate glass has a fracture toughness of more than 1.3 MPa·m$^{1/2}$, the productivity of a thin plate glass raw plate for forming the curved thin plate glass deteriorates, and as a result, there is a problem in that manufacturing costs of curved laminated glass are increased.

According to an exemplary embodiment of the present invention, the curved soda lime glass may have a fracture toughness value of 0.7 MPa·m$^{1/2}$ to 0.85 MPa·m$^{1/2}$. Specifically, the curved soda lime glass may have a fracture toughness value of 0.75 MPa·m$^{1/2}$ to 0.83 MPa·m$^{1/2}$, or 0.77 MPa·m$^{1/2}$ to 0.8 MPa·m$^{1/2}$.

The fracture toughness values of the curved soda lime glass and the curved thin plate glass may be measured by using an indentation fracture toughness measurement method, which is a method of calculating the fracture toughness value by pressing down the glass with a Vickers indenter until cracks occur in the glass, and then using a crack length, an indenter mark, a load, and the like. Specifically, the fracture toughness values of the curved thin plate glass and the curved soda lime glass may be measured by setting an indentation load to 2 Kgf in accordance with the KS L 1600:2010 standard under the conditions of a temperature at 24° C. and a humidity at 35 RH %.

According to an exemplary embodiment of the present invention, an elastic modulus ratio of the curved soda lime glass to the curved thin plate glass may be 1:1.01 to 1:1.2. Specifically, an elastic modulus ratio of the curved soda lime glass to the curved thin plate glass may be 1:1.04 to 1:1.17, 1:1.06 to 1:1.15, 1:1.08 to 1:1.12, or 1:1.08 to 1:1.15. Since the curved thin plate glass has an elastic modulus within the above-described range as compared to that of the curved soda lime glass, the curved laminated glass may have a robust structure even when the curved laminated glass includes curved thin plate glass which is more lightweight and thinner than the curved soda lime glass.

According to an exemplary embodiment of the present invention, the curved thin plate glass may have an elastic modulus of 70 GPa to 90 GPa. Specifically, the curved thin plate glass may have an elastic modulus of 73 GPa to 87 GPa, 75 GPa to 85 GPa, 78 GPa to 80 GPa, 75 GPa to 80 GPa, or 80 GPa to 90 GPa. In addition, the soda lime glass may have an elastic modulus of 65 GPa to 75 GPa.

The elastic modulus of the curved thin plate glass and the curved soda lime glass may be measured by a 3 point bending test. Specifically, the elastic modulus of the curved thin plate glass and the curved soda lime glass may be measured by a 3 point bending test using a universal testing machine equipment under the conditions of a temperature at 24° C. and a humidity at 35 RH %. More specifically, the elastic modulus may be derived by setting a width and a support span of a sample to 20 mm and 50 mm, respectively, deriving a strain-stress (S-S) curve by converting a displacement and a load measured by the UTM equipment into a strain and a stress, and then using a slope calculated by linear fitting of the S-S curve.

According to an exemplary embodiment of the present invention, a thickness ratio of the curved soda lime glass to the curved thin plate glass may be 1:0.1 to 1:0.5. Specifically, a thickness ratio of the curved soda lime glass to the curved thin plate glass may be 1:0.2 to 1:0.5, 1:0.2 to 1:0.4, 1:0.25 to 1:0.3, or 1:0.25 to 1:0.45. It is possible to effectively prevent an increase in probability of fracture caused by a drop in stiffness of curved laminated glass by adjusting the thickness ratio of the curved soda lime glass to the curved thin plate glass to the above-described range. Furthermore, it is possible effectively achieve a reduction in weight and thinning of curved laminated glass to be manufactured. When the thickness ratio of the curved soda lime glass to the curved thin plate glass is 1:less than 0.1, there may occur a problem in that impact resistance of curved laminated glass deteriorates, and when the thickness ratio of the curved soda lime glass to the curved thin plate glass is 1:more than 0.5, there may occur a problem in that it is difficult to effectively reduce a weight of curved laminated glass.

Figure 3:
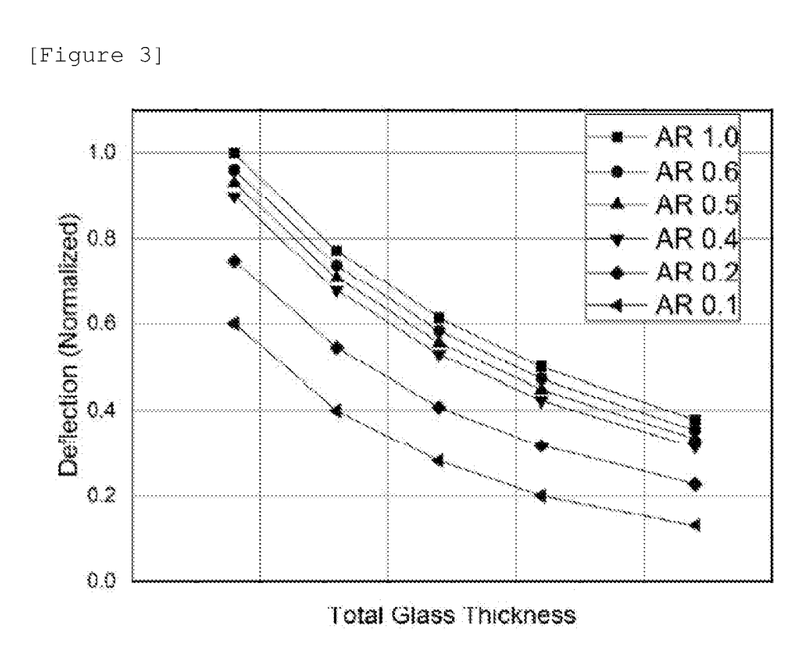
FIG. 3 is a view illustrating a result of securing stiffness according to a thickness ratio of curved soda lime glass to curved thin plate glass according to an exemplary embodiment of the present invention.

FIG. 3 is a view illustrating a result of securing stiffness according to the thickness ratio of curved soda lime glass to curved thin plate glass according to an exemplary embodiment of the present invention. Specifically, FIG. 3 is a view illustrating that an amount of drooping at the center of curved laminated glass is analyzed by applying a predetermined load to the center of the curved laminated glass in a state where four corners of the curved laminated glass according to an exemplary embodiment of the present invention are fixed. In FIG. 3, the x-axis indicates the total thickness of glass, and the y-axis indicates the amount of glass drooping, that is, a degree to which glass is bent.

According to an exemplary embodiment of the present invention, an asymmetry ratio (AR), which is [a thickness of curved thin plate glass]/[a thickness of curved soda lime glass], may satisfy a range of 0.1 to 0.5. A small AR means that the thickness of the curved thin plate glass becomes small, and the thickness of the curved soda lime glass becomes large. Referring to FIG. 3, stiffness may be secured by adjusting the thickness ratio of the curved thin plate glass to the curved soda lime glass to the above-described range to lower the degree to which the curved laminated glass is bent.

Therefore, according to an exemplary embodiment of the present invention, a stiffness increasing effect, a weight reducing effect, and a thinning effect of the curved laminated glass may be more improved by adjusting the thickness ratio of the curved thin plate glass 200 to the curved soda lime glass 100 to the above-described range.

According to an exemplary embodiment of the present invention, as the curved thin plate glass, glass composed of component and content typically used as a window glass of transportation means in the art may be adopted and used without particular limitation, as long as the glass satisfies the fracture toughness value, the elastic modulus, the Vickers hardness, and the like described above.

According to an exemplary embodiment of the present invention, the thin plate glass may be alkali-free glass. Specifically, the curved thin plate glass may be curved alkali-free glass. The curved alkali-free glass includes 46 wt % to 57 wt % of $SiO_2$, 21 wt % to 29 wt % of $Al_2O_3$, 3 wt % to 14 wt % of MgO, 11 wt % to 16 wt % of CaO, and 1 wt % to 5 wt % of SrO based on 100 wt % of the composition, and a glass composition which substantially contains no alkali metal oxide may be used.

The glass composition which substantially contains no alkali metal oxide means a case where an alkali metal oxide is not included in glass at all, or a case where the alkali metal oxide is partially included, but the content thereof is so slight that an amount of alkali metal oxide, which is negligible as a composition component of glass, is included, and the like. For example, the term "substantially" means that in a process of manufacturing glass, a trace of alkali metal element inevitably incorporated into glass from refractory materials which are brought into contact with melt glass, impurities in a glass raw material, and the like may be contained.

According to an exemplary embodiment of the present invention, as the curved alkali-free glass, it is possible to use alkali-free glass containing less than 1% of alkali metal (Li, Na, K, and the like) oxide as represented by mass percentage based on oxides, and alkali-free glass may be used without limitation as long as the alkali-free glass may obtain desired mechanical properties, weatherability, surface smoothness, and the like. As the curved alkali-free glass, alkali-free borosilicate glass or alkali-free aluminoborosilicate glass may be used, and a glass manufactured by a float method, and alkali-free glass manufactured by a down draw method or a fusion method may also be used.

Since the curved alkali-free glass does not include alkali components which weaken the bonding strength of glass, or includes an extremely small amount of the alkali components, the curved alkali-free glass has the wear resistance and the impact resistance, which are higher than those of general glass, even though the curved alkali-free glass has a small thickness, so that the weight of laminated glass may be effectively reduced, and wear resistance and durability may be improved.

According to an exemplary embodiment of the present invention, the curved thin plate glass may be tempered glass or non-tempered glass. However, it may be preferred that as the curved thin plate glass, non-tempered glass is used. Specifically, the curved thin plate glass may be non-tempered glass which is not chemically tempered, non-tempered glass which is not tempered by heat, and non-tempered glass which is not tempered by using chemicals and heat.

Generally tempered glass is glass having an increased strength and imparted with impact resistance, resiliency resistance, and the like, and examples thereof include heat-tempered glass using physical heat and chemically tempered glass using a chemical ion exchange. When curved laminated glass is manufactured by using the aforementioned tempered glass, the process of processing and molding the tempered glass is not easy, so that there are problems in that the defect rate of the curved laminated glass is high and costs of manufacturing the curved laminated glass are high. Further, ion tempered glass requires an ion tempering process at high temperature for a predetermined time, and then a cleaning process, so that there are problems in that the time for manufacturing curved laminated glass is increased and the production costs thereof are increased.

In contrast, according to an exemplary embodiment of the present invention, the processing is easy because it is possible to use non-tempered thin plate glass which is not subjected to a process such as chemical tempering and heat tempering, and manufacturing costs may be reduced by omitting the tempering process, so that it is possible to solve problems which may occur during a process of manufacturing curved laminated glass by using tempered glass in the related art, and to reduce the manufacturing costs and the manufacturing time. Further, the thin plate glass is not subjected to a tempering treatment, and thus may easily secure a visual field even though fracture occurs when the thin plate glass is applied to a windshield.

According to an exemplary embodiment of the present invention, as the curved soda lime glass, glass composed of component and content typically used as a window glass of transportation means in the art may be adopted and used without particular limitation, as long as the glass satisfies the fracture toughness value, the elastic modulus, the Vickers hardness, and the like described above. As the curved soda lime glass, for example, it is possible to use glass with a composition including 65 wt % to 75 wt % of $SiO_2$, 0 wt % to 10 wt % of $Al_2O_3$, 10 wt % to 15 wt % of $NaO_2$, 0 wt % to 5 wt % of $K_2O$, 1 wt % to 12 wt % of CaO, and 0 wt % to 8 wt % of MgO based on 100 wt % of the composition, but glass may be used without limitation as long as the glass may obtain desired mechanical properties, weatherability, surface smoothness, and the like. Further, as the curved soda lime glass, it is also possible to use glass manufactured by a float method using a float bath and glass manufactured by a down draw method or a fusion method.

According to an exemplary embodiment of the present invention, the curved thin plate glass may have a thickness of 0.3 mm to 1.0 mm. Specifically, the curved thin plate glass may have a thickness of 0.3 mm to 0.8 mm, 0.4 mm to 0.6 mm, 0.3 mm to 0.7 mm, or 0.5 mm to 0.8 mm. Curved laminated glass including curved thin plate glass having a thickness within the above-described range has excellent impact resistance, and simultaneously, may become effectively lightweight and thin.

When the curved thin plate glass has a thickness of less than 0.3 mm, there may occur a problem in that the impact resistance of the curved laminated glass is reduced, and when the curved thin plate glass has a thickness of more than 1 mm, it may be difficult to obtain a weight reducing and thinning effect of the curved laminated glass.

Therefore, according to an exemplary embodiment of the present invention, due to high mechanical properties of curved thin plate glass having a thickness within the above-described range, there are advantages in that a reduction in weight and thinning of the curved laminated glass may be effectively achieved, the curved laminated glass is strong against a local impact, and even when the curved laminated glass is fractured, a visual field of a user is much less affected or secondary damage caused by shattered glass is much less caused than tempered glass.

According to an exemplary embodiment of the present invention, the curved soda lime glass may have a thickness of 2 mm to 3 mm. Specifically, the curved soda lime glass may have a thickness of 2.5 mm to 3 mm. When the curved soda lime glass has a thickness of less than 2 mm, there may occur a problem in that the impact resistance of the curved laminated glass is reduced, and when the curved soda lime glass has a thickness of more than 3 mm, it may be difficult to obtain a weight reducing and thinning effect of the curved laminated glass. Furthermore, the upper limit value and the lower limit value of the thicknesses of the curved thin plate glass and the curved soda lime glass included in the curved laminated glass may be determined by considering that external force and mechanical impact force applied to the curved laminated glass are elastically absorbed.

According to an exemplary embodiment of the present invention, curved laminated glass, which includes the curved thin plate glass and the curved soda lime glass having a thickness within the above-described range, may have a thickness by 50% to 80% and a weight by 50% to 80% as compared to those of existing curved laminated glass in which two sheets of existing soda lime glass having a thickness of about 2.1 mm are laminated. Therefore, according to an exemplary embodiment of the present invention, it is possible to easily implement curved laminated glass which has a reduced weight and is thinned as compared to existing curved laminated glass.

According to an exemplary embodiment of the present invention, the curved thin plate glass may be laminated onto a concave surface of the curved soda lime glass by a lamination film or an adhesive. Specifically, one convex surface of the curved thin plate glass may be laminated onto one concave surface of the curved soda lime glass by a lamination film or an adhesive.

A lamination film according to an exemplary embodiment of the present invention may be single-layered or multi-layered. Further, when the lamination film is manufactured so as to have two or more layers, the compositions of the layers may be different from each other, and the thicknesses of the layers may be the same as or different from each other. As the lamination film, a (co)polymer film formed of a material typically used as a lamination layer in laminated glass in the art may be adopted and used without particular limitation, such as a copolymer film of polyvinyl alcohol (PVA) and polyvinyl butyral (PVB). Specifically, it is possible to use polyethylene (PE), an ethylene vinyl acetate copolymer (EVA), polypropylene (PP), polystyrene (PS), a methacrylic resin (PMA), polyvinyl chloride (PVC), polyethylene terephthalate (PET), polybutylene terephthalate (PBT), cellulose acetate (CA), a diallyl phthalate resin (DAP), a urea resin (UP), a melamine resin (MF), unsaturated polyester (UP), polyvinyl butyral (PVB), polyvinyl formal (PVF), polyvinyl alcohol (PVAL), a vinyl acetate resin (PVAc), an ionomer (IO), polymethylpentene (TPX), poly(vinylidene chloride) (PVDC), polysulfone (PSF), polyvinylidene fluoride (PVDF), a methacrylic-styrene copolymer resin (MS), polyarylate (PAR), polyallyl sulfone (PASF), polybutadiene (BR), polyether sulfone (PESF), or polyetheretherketone (PEEK). As the lamination film, it is possible to use a lamination film which has an adhesive strength capable of fixing the curved thin plate glass and the curved soda lime glass with a desired strength, excellent transmission performance with respect to visible light, and excellent chemical durability.

According to an exemplary embodiment of the present invention, the lamination film may have a thickness of 0.5 mm to 1 mm. Specifically, the lamination film may have a thickness of 0.6 mm to 0.9 mm. When the lamination film has a thickness of less than 0.5 mm, impact absorbability of the lamination film deteriorates, and the adhesive strength to the curved thin plate glass and the curved soda lime glass is not sufficient, so that there may occur a problem in that an interfacial delamination occurs while the force of fixing the curved thin plate glass and the curved soda lime glass becomes weak. Meanwhile, when the lamination film has a thickness of more than 1.0 mm, there may occur a problem in that the stiffness of the curved laminated glass deteriorates.

Therefore, according to an exemplary embodiment of the present invention, in order to stably fix the curved thin plate glass and the curved soda lime glass while maintaining the stiffness of the curved laminated glass, a lamination film having a thickness within the above-described range may be used.

According to an exemplary embodiment of the present invention, the adhesive may include at least one of an optically clear adhesive (OCA), a liquid optically clear adhesive (LOCA), and an optically clear resin (OCR). The adhesive may be applied to have a thickness of 0.5 mm to 1.5 mm on one surface of the curved thin plate glass or one concave surface of the curved soda lime glass.

According to an exemplary embodiment of the present invention, the curved thin plate glass and the curved soda lime glass may be in a state of being matched with each other. In the present specification, the state where the curved thin plate glass and the curved soda lime glass are matched with each other may mean a state where the curved thin plate glass and the curved soda lime glass form an edge together at the same position. As the curved thin plate glass and the curved soda lime glass are matched with each other, a lifting between the glasses may be suppressed in curved laminated glass, and the transmission performance of the curved laminated glass may be improved.

According to an exemplary embodiment of the present invention, curved laminated glass including the curved thin plate glass and the curved soda lime glass may have a structure in which both sides thereof are more bent than the center portion thereof. The curved laminated glass having the structure may be applied to glass for an automobile. For example, the curved laminated glass may be applied to a front window, a side window, a rear window, and a sun roof window in the glass for the automobile. Particularly, when the curved laminated glass is applied to a front window in the glass for the automobile, the curved laminated glass may reduce resistance against a collision with traveling wind with a streamlined curved shape during the driving an automobile.

Referring to FIG. 2, curved laminated glass in which one concave surface of the curved soda lime glass 100 and the other convex surface of the curved thin plate glass 200 are laminated may be used as glass for an automobile. When the curved thin plate glass 200 is disposed on the inner side of glass for an automobile, the curved thin plate glass 200 is not shattered even though the curved laminated glass is broken, so that it is possible to effectively prevent passengers from being damaged.

According to an exemplary embodiment of the present invention, the curved thin plate glass and the curved soda lime glass may have the same radius of curvature. In addition, the radius of curvature of the curved soda lime glass and the curved thin plate glass may be formed to be different from each other according to the use of the applied glass.

According to an exemplary embodiment of the present invention, the curved soda lime glass and the curved thin plate glass may each independently further include one or more coloring components. A heat blocking function may be imparted to the curved laminated glass by adding a coloring component to the curved thin plate glass and the curved soda lime glass. As the coloring component, $Fe_2O_3$, CoO, Se, and the like may be used, but the coloring component is not limited thereto. Furthermore, the content of the coloring component included in the curved thin plate glass and the curved soda lime glass may be adjusted according to the use in which the curved laminated glass is used. As an example, it is possible to use, in glass for an automobile, curved thin plate glass in which the content of $Fe_2O_3$ is 0.0001 part by weight to 2 parts by weight, the content of CoO is 0.0005 part by weight to 1 part by weight, and the content of Se is 0.01 part by weight to 0.1 part by weight based on 100 parts by weight of the glass composition. When the curved laminated glass is applied to a front window or a side or rear window in glass for an automobile, the visible light transmittance of the curved laminated glass may be formed at 70% or more by adjusting the content of the coloring component. Further, when the curved laminated glass is applied to a sun roof window in glass for an automobile, the visible light transmittance of the curved laminated glass may be formed at about 5%.

Another exemplary embodiment of the present invention provides a method for manufacturing a curved laminated glass, the method including: preparing a curved soda lime glass; providing a thin plate glass which is plate-like on a concave surface of the curved soda lime glass; and laminating the thin plate glass onto the concave surface of the soda lime glass by elastically deforming the thin plate glass to form a curved thin plate glass, in which a thickness of the curved soda lime glass is larger than a thickness of the curved thin plate glass, and compressive stress is formed on a surface opposite to a surface of the curved thin plate glass adjacent to the curved soda lime glass.

According to another exemplary embodiment of the present invention, curved laminated glass may be economically manufactured through a simple process.

The curved soda lime glass, the curved thin plate glass, the lamination film, and the like in the method for manufacturing curved laminated glass according to another exemplary embodiment of the present invention may be the same as the curved soda lime glass, the curved thin plate glass, the lamination film, and the like in the curved laminated glass according to the aforementioned exemplary embodiment of the present invention.

Figure 4:
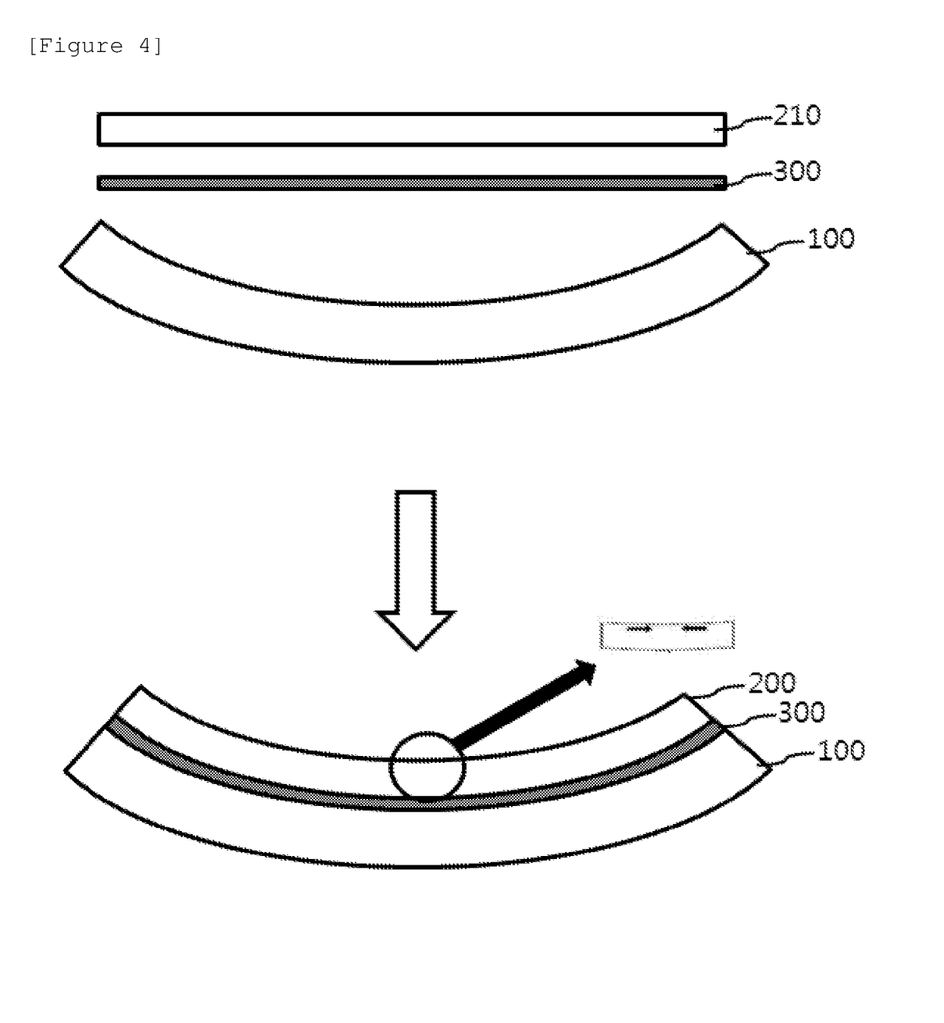
FIG. 4 is a view illustrating a process of laminating a thin plate glass on a concave surface of a curved soda lime glass according to an exemplary embodiment of the present invention.

FIG. 4 is a view illustrating a process of laminating a thin plate glass on a concave surface of curved soda lime glass according to an exemplary embodiment of the present invention. Specifically, FIG. 4 is a view illustrating the manufacture of curved laminated glass including the curved thin plate glass 200 which is laminated onto one concave surface of the curved soda lime glass 100 through a lamination film 300 by disposing the lamination film 300 and plate-like thin plate glass 210 on the concave surface of the curved soda lime glass 100 which is molded into a curved surface, and elastically deforming the plate-like thin plate glass 210.

According to still another exemplary embodiment of the present invention, in the steps of preparing the curved soda lime glass and the thin plate glass, the soda lime glass and the thin plate glass may be cut into a desired size. In addition, in order to prevent the soda lime glass and the thin plate glass from being fractured in the process of manufacturing curved laminated glass, the side surfaces of the soda lime glass and the thin plate glass may be subjected to beveling processing.

According to yet another exemplary embodiment of the present invention, in the step of preparing the curved soda lime glass, the curved soda lime glass may be manufactured by processing a plate-like soda lime glass into a curved surface using a method typically used in the art. As an example, plate-like soda lime glass may be molded by means of a self-weight method by exposing the plate-like soda lime glass to high temperature in a state where the plate-like soda lime glass is placed onto a molding frame, or by means of a press method of inserting the plate-like soda lime glass between upper/lower molds, and then applying pressure thereon at high temperature. Specifically, the plate-like soda lime glass may be molded into a curved surface by using a self-weight method at a temperature of 500° C. to 700° C.

According to still yet another exemplary embodiment of the present invention, in the lamination step, the thin plate glass may be elastically deformed at a temperature of 20° C. to 35° C. Specifically, the plate-like thin plate glass is disposed on a concave surface of the curved soda lime glass, the plate-like thin plate glass is elastically deformed at a temperature of 20° C. to 35° C., thereby manufacturing curved laminated glass including curved thin plate glass laminated onto a concave surface of the curved soda lime glass.

According to a further exemplary embodiment of the present invention, soda lime glass is processed into a curved surface, and then plate-like thin plate glass may be elastically deformed at a temperature of 20° C. to 35° C., so that there is an advantage in that the process of manufacturing curved laminated glass is simplified as compared to a process of processing glass into a curved surface through an existing heating process. Therefore, according to another further exemplary embodiment of the present invention, the processing costs and the processing time of the curved laminated glass may be reduced.

In addition, in the process in which the plate-like thin plate glass is elastically deformed and thus formed as curved thin plate glass, the impact resistance and fracture strength of the curved laminated glass may be improved as compressive stress is formed on a surface opposite to the surface of the curved thin plate glass adjacent to the curved soda lime glass.

According to still another further exemplary embodiment of the present invention, a method of applying elastic deformation to the plate-like thin plate glass is not particularly limited as long as the method is a method typically used in the art. As an example, curved thin plate glass may be manufactured by elastically deforming the plate-like thin plate glass at room temperature of 20° C. to 35° C. through a compression process using a high temperature roller or vacuum ring/vacuum bag process.

According to yet another further exemplary embodiment of the present invention, in the lamination step, the curved thin plate glass may be laminated onto a concave surface of the curved soda lime glass by using a lamination film or an adhesive. As an example, a lamination film is disposed between one surface of the plate-like thin plate glass and one concave surface of the curved soda lime glass, and then the elastically deformed curved thin plate glass may be laminated onto one surface of the curved soda lime glass through the lamination film. In addition, an adhesive is applied onto one surface of the plate-like thin plate glass and/or one concave surface of the curved soda lime glass, thereby laminating an elastically deformed curved thin plate glass onto a concave surface of the curved soda lime glass through the adhesive.

According to still yet another further exemplary embodiment of the present invention, the lamination step may be carried out at 80° C. to 140° C. By laminating the elastically deformed curved thin plate glass and the curved soda lime glass at a temperature of 80° C. to 140° C., it is possible to prevent the adhesive strength from being reduced due to the denaturation of the lamination film or the adhesive, and to reduce manufacturing costs of the curved laminated glass.

Furthermore, the elastically deformed curved thin plate glass and the curved soda lime glass may be completely laminated by carrying out a process of treating the curved thin plate glass and the curved soda lime glass at high temperature and high pressure in an autoclave.

The lamination film or the adhesive used to laminate the elastically deformed curved thin plate glass onto a concave surface of the curved soda lime glass according to a still further exemplary embodiment of the present invention may be the same as the lamination film or the adhesive used in the curved laminated glass according to an exemplary embodiment of the present invention.

According to a yet still further exemplary embodiment of the present invention, a thickness ratio of the curved soda lime glass to the thin plate glass may be 1:0.1 to 1:0.5. Specifically, a thickness ratio of the curved soda lime glass to the curved thin plate glass may be 1:0.2 to 1:0.5, 1:0.2 to 1:0.4, 1:0.25 to 1:0.3, or 1:0.25 to 1:0.45. By adjusting the thickness ratio of the curved soda lime glass to the curved thin plate glass to the above-described range, it is possible to effectively prevent an increase in probability of fracture caused by a drop in stiffness of curved laminated glass. Furthermore, a reduction in weight and thinning of curved laminated glass to be manufactured may be effectively achieved.

According to another exemplary embodiment of the present invention, the curved thin plate glass may have a thickness of 0.3 mm to 1.0 mm. Specifically, the curved thin plate glass may have a thickness of 0.3 mm to 0.8 mm, 0.4 mm to 0.6 mm, 0.3 mm to 0.7 mm, or 0.5 mm to 0.8 mm. Curved laminated glass including curved thin plate glass having a thickness within the above-described range has excellent impact resistance, and simultaneously, may become effectively lightweight and thin.

According to still another exemplary embodiment of the present invention, the curved soda lime glass may have a thickness of 2 mm to 3 mm. Specifically, the curved soda lime glass may have a thickness of 2.5 mm to 3 mm. When the curved soda lime glass has a thickness of less than 2 mm, there may occur a problem in that the impact resistance of the curved laminated glass is reduced, and when the curved soda lime glass has a thickness of more than 3 mm, it may be difficult to obtain a weight reducing and thinning effect of the curved laminated glass.

According to yet another exemplary embodiment of the present invention, a Vickers hardness ratio of the curved soda lime glass to the curved thin plate glass may be 1:1.1 to 1:1.3. Specifically, a Vickers hardness ratio of the curved soda lime glass to the curved thin plate glass may be 1:1.12 to 1:1.27, 1:1.15 to 1:1.25, or 1:1.2 to 1:1.23. Curved laminated glass including the curved thin plate glass having a higher hardness than that of the curved soda lime glass may have excellent wear resistance, scratch resistance, and durability.

According to still yet another exemplary embodiment of the present invention, the curved thin plate glass may have a Vickers hardness of 5.5 GPa to 7 GPa. Specifically, the curved thin plate glass may have a Vickers hardness of 5.8 GPa to 6.9 GPa, 6.0 GPa to 6.7 GPa, or 6.2 GPa to 6.5 GPa. Curved laminated glass including curved thin plate glass having a Vickers hardness value within the above-described range may have excellent wear resistance and durability. Further, the soda lime glass may have a Vickers hardness of 5.2 GPa to 5.8 GPa.

The elastic modulus and fracture toughness values of the curved thin plate glass and the curved soda lime glass according to a further exemplary embodiment of the present invention may be the same as the elastic modulus and fracture toughness values of the curved thin plate glass and the curved soda lime glass according to an exemplary embodiment of the present invention.

According to another further exemplary embodiment of the present invention, the curved thin plate glass may be non-tempered glass. Specifically, the processing is easy because it is possible to use non-tempered glass which is not subjected to a process such as chemical tempering and heat tempering, and manufacturing costs of the curved laminated glass may be reduced by omitting the tempering process, so that it is possible to reduce the manufacturing costs and the manufacturing time. Further, since the thin plate glass is not subjected to a tempering treatment, it is possible to secure a visual field even though a fracture occurs when the thin plate glass is applied to a windshield.

According to still another further exemplary embodiment of the present invention, the curved soda lime glass and the curved thin plate glass may have the substantially same radius of curvature. The case that the curved soda lime glass and the curved thin plate glass have the substantially same radius of curvature may mean a case where the curved soda lime glass and the curved thin plate glass have the same radius of curvature, or a case where even though the radius of curvature of the curved soda lime glass and the curved thin plate glass are slightly different from each other, the curved soda lime glass and the curved thin plate glass have the same radius of curvature after being laminated to each other, and the like.

The curved soda lime glass and the curved thin plate glass may have the same radius of curvature, and thus may be more precisely matched with each other, and the transmission performed of curved laminated glass manufactured through the matching may be improved. When the curved laminated glass is used in a front window for an automobile, there is an advantage in that a user may more clearly secure the visual field.

According to yet another further exemplary embodiment of the present invention, as illustrated in FIG. 4, it is possible to manufacture curved laminated glass in which one convex surface of the curved thin plate glass 200 is laminated onto one concave surface of the curved soda lime glass 100. Since the curved thin plate glass is laminated onto one concave surface of the curved soda lime glass, it may be preferred that plate-like thin plate glass before being elastically deformed into a curved surface has a smaller dimension than that of the plate-like soda lime glass before being processed into a curved surface. In addition, it may be preferred that the curved thin plate glass which is elastically deformed and the curved soda lime glass are laminated to each other so as to form an edge together at the same position and thus to be matched with each other.

Hereinafter, the preset disclosure will be described in more detail through Examples. These Examples are provided for only explaining the present disclosure, and are not intended to limit the present disclosure.

Example 1

Alkali-free glass including 61 wt % of $SiO_2$, 16 wt % of $Al_2O_3$, 3 wt % of MgO, 8 wt % or less of CaO, and 0.05 wt % of SrO based on 100 wt % of a composition and having a thickness of 0.5 mm was prepared as thin plate glass, and soda lime glass including 73 wt % of $SiO_2$, 0.15 wt % of $Al_2O_3$, 14 wt % of $Na_2O$, 0.03 wt % of $K_2O$, 9 wt % of CaO, and 4 wt % of MgO based on 100 wt % of a composition and having a thickness of 2.0 mm was prepared as soda lime glass. Further, a polyvinyl butyral (PVB) film having a thickness of 0.76 mm was prepared as a lamination film. The alkali-free glass had an elastic modulus of 78 GPa, a Vickers hardness of 6.3 GPa, and a fracture toughness of 1.20 $MPa \cdot m^{1/2}$, and the soda lime glass had an elastic modulus of GPa, a Vickers hardness of 5.6 GPa, and a fracture toughness of 0.85 $MPa \cdot m^{1/2}$.

First, the soda lime glass was heated at 600° C. for 60 seconds, and processed into a curved surface by using a self-weight. Thereafter, the lamination film was placed between one concave surface of the soda lime glass, which was processed into a curved surface, and the alkali-free glass, and the alkali-free glass was elastically deformed by compression with a vacuum ring at 20° C. and under a pressure condition of 300 torr. Thereafter, curved laminated glass was manufactured by treating the alkali-free glass and the soda lime glass, which were compressed, in an autoclave under conditions of 130° C. and 100 bar.

Example 2

Curved laminated glass was manufactured in the same manner as in Example 1, except that in Example 2, soda lime glass having a thickness of 2.1 mm was prepared.

Comparative Example 1

Two sheets of soda lime glass including 73 wt % of $SiO_2$, 0.15 wt % of $Al_2O_3$, 14 wt % of $Na_2O$, 0.03 wt % of $K_2O$, 9 wt % of CaO, and 4 wt % of MgO based on 100 wt % of a composition and having a thickness of 2.0 mm and a PVB film having a thickness of 0.34 mm as a lamination film were prepared. The soda lime glass had an elastic modulus of 72 GPa, a Vickers hardness of 5.6 GPa, and a fracture toughness of 0.85 MPa·m$^{1/2}$.

First, each of the two sheets of the soda lime glass was heated at 600° C. for 60 seconds, and processed into a curved surface by using a self-weight. Thereafter, the lamination film was placed between the two sheets of the soda lime glass, which were processed into a curved surface, and was compressed by applying pressure thereon at 80° C. and under a pressure condition of 300 torr. Thereafter, curved laminated glass was manufactured by treating the two sheets of the soda lime glass, which were compressed, in an autoclave under conditions of 130° C. and 11.76 bar.

Comparative Example 2

Curved laminated glass was manufactured in the same manner as in Comparative Example 1, except that in Comparative Example 2, two sheets of soda lime glass having a thickness of 2.1 mm were prepared.

Manufacturing Result

It could be confirmed that Examples 1 and 2 of the present disclosure, in which alkali-free glass was elastically deformed and thus laminated onto one concave surface of soda lime glass processed into a curved surface, could produce curved laminated glass, in which curved alkali-free glass and curved soda lime glass were laminated to each other in a state of being matched with each other, at a high rate and thus could improve the productivity of the curved laminated glass, as compared to Comparative Examples 1 and 2 in which two sheets of soda lime glass were heated and processed into a curved surface by a self-weight molding method.

EXPLANATION OF REFERENCE NUMERALS AND SYMBOLS

100: Curved soda lime glass
200: Curved thin plate glass
210: Plate-like thin plate glass
300: Lamination film

The invention claimed is:

1. A curved laminated glass for automobile comprising:
    a curved soda lime glass; and
    a curved thin plate glass provided on a concave surface of the curved soda lime glass,
    wherein a thickness of the curved soda lime glass is larger than a thickness of the curved thin plate glass,
    wherein a first surface of the curved thin plate glass is adjacent to the curved soda lime glass, and compressive bending stress is formed on a second surface of the curved thin plate, which is opposite to the first surface of the curved thin plate glass,
    wherein the curved thin plate glass is non-tempered alkali-free glass including 26 wt % to 29 wt % of $Al_2O_3$, and
    wherein a Vickers hardness ratio of the curved soda lime glass to the curved thin plate glass is 1:1.1 to 1:1.3.

2. The curved laminated glass for automobile of claim 1, wherein a thickness ratio of the curved soda lime glass to the curved thin plate glass is 1:0.1 to 1:0.5.

3. The curved laminated glass for automobile of claim 1, wherein the thickness of the curved thin plate glass is 0.3 mm to 1.0 mm.

4. The curved laminated glass for automobile of claim 1, wherein the curved thin plate glass is laminated onto the concave surface of the curved soda lime glass by a lamination film or an adhesive.

5. The curved laminated glass for automobile of claim 1, wherein the curved thin plate glass has a Vickers hardness of 5.5 GPa to 7 GPa.

6. A method for manufacturing a curved laminated glass for automobile, the method comprising:
    preparing a curved soda lime glass;
    providing a thin plate glass which is flat on a concave surface of the curved soda lime glass; and
    laminating the thin plate glass onto the concave surface of the soda lime glass by elastically deforming the thin plate glass to form a curved thin plate glass,
    wherein a thickness of the curved soda lime glass is larger than a thickness of the curved thin plate glass,
    wherein a first surface of the curved thin plate glass is adjacent to the curved soda lime glass, and compressive bending stress is formed on a second surface of the curved thin plate, which is opposite to the first surface of the curved thin plate glass,
    wherein the curved thin plate glass is non-tempered alkali-free glass including 26 wt % to 29 wt % of $Al_2O_3$, and
    wherein a Vickers hardness ratio of the curved soda lime glass to the curved thin plate glass is 1:1.1 to 1:1.3.

7. The method of claim 6, wherein in the step of laminating, the thin plate glass is elastically deformed at a temperature of 20° C. to 35° C.

8. The method of claim 6, wherein in the step of laminating, the curved thin plate glass is laminated onto a concave surface of the curved soda lime glass by using a lamination film or an adhesive.

9. The method of claim 6, wherein a thickness ratio of the curved soda lime glass to the curved thin plate glass is 1:0.1 to 1:0.5.

10. The method of claim 6, wherein the thickness of the curved thin plate glass is 0.3 mm to 1.0 mm.

11. The method of claim 6, wherein the curved thin plate glass has a Vickers hardness of 5.5 GPa to 7 GPa.

* * * * *